United States Patent
Viljoen et al.

(10) Patent No.: US 7,831,919 B1
(45) Date of Patent: Nov. 9, 2010

(54) GENERIC WEB SERVICE FRONTEND

(75) Inventors: Pieter Viljoen, Marina Del Rey, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 766 days.

(21) Appl. No.: 11/612,404

(22) Filed: Dec. 18, 2006

(51) Int. Cl.
G06F 3/00 (2006.01)
G06F 17/00 (2006.01)
G06F 3/048 (2006.01)
G06F 15/16 (2006.01)

(52) U.S. Cl. .......................... 715/762; 715/202; 715/203; 715/204; 715/221; 715/222; 715/239; 715/760; 715/763; 709/203

(58) Field of Classification Search .............. 715/760, 715/762, 763, 764, 202, 203, 204, 221, 222, 715/239, 234; 709/203
See application file for complete search history.

(56) References Cited

U.S. PATENT DOCUMENTS

| | | | |
|---|---|---|---|
| 7,168,035 B1 * | 1/2007 | Bell et al. .................... | 715/234 |
| 7,194,683 B2 * | 3/2007 | Hind et al. ................... | 715/235 |
| 7,448,024 B2 * | 11/2008 | Breeden et al. ............. | 717/125 |
| 2005/0114305 A1 * | 5/2005 | Haynes et al. ................ | 707/3 |
| 2005/0278622 A1 * | 12/2005 | Betts et al. .................. | 715/515 |

OTHER PUBLICATIONS

Building XML Data-Driven Web Sites with FrontPage 2003, Aug. 2003, msdn.microsoft.com.*
Consuming XML Web Services with FrontPage, Jul. 2002, msdn.microsoft.com.*

* cited by examiner

Primary Examiner—Tadesse Hailu
Assistant Examiner—Nicholas S Ulrich
(74) Attorney, Agent, or Firm—Brill Law Office; Jeffrey Brill

(57) ABSTRACT

A publisher uses a toolbox to graphically define web forms, by selecting and configuring components such as buttons, text boxes, menus, etc. Underlying code for the web forms (such as Extensible Markup Language, or XML) is automatically generated. The publisher defines transforms (such as Extensible Stylesheet Markup Language Transforms, or XSLTs) that process the exchange of data between the front end and the backend web service. The transforms and the code underlying the web forms is automatically combined into a frontend to the web service. The web based frontend is published on a user site, such that users can access the backend web service through the frontend.

20 Claims, 3 Drawing Sheets

GENERIC WEB SERVICE FRONTEND

TECHNICAL FIELD

This invention pertains generally to web services, and more specifically to automatically creating web service frontends.

BACKGROUND

The recent availability of new web service tools such as SOAP, WSDL, XML-RPM etc. has enabled rapid development and roll-out of complicated web service functionality. Prior to the availability of such tools, large web service projects such as online backup, central queuing, online product pricing, image storage and retrieval and online searching took long amounts of time, large programming teams and substantial financial investments to develop. As a result of the simplified development enabled by the new tools, more web services are available to end users today.

End users benefit from the greater availability of these web services, as the services themselves provide useful functionality. However, although the available tools allow rapid development of the underlying functionality, they do not provide or automate development of an associated user interface. Therefore, although there is now a greater availability of web services, these services often lack a functional web based frontend. As the publishers of web based services have no tools for easily creating user interfaces, the publishers tend to focus on the web services themselves, and leave the frontend to other developers.

What is needed are methods, computer readable media and computer systems that provide a generic framework that greatly simplifies the task of creating a web based frontend for web services.

SUMMARY

Generic web frontend creation tools allow publishers of web services to quickly and easily create web frontends for their backend web based services. A publisher uses a toolbox to graphically define web forms, by selecting and configuring components such as buttons, text boxes, menus, etc. Underlying code for the web forms (such as Extensible Markup Language, or XML) is automatically generated. The publisher defines transforms (such as Extensible Stylesheet Markup Language Transforms, or XSLTs) that process the exchange of data between the front end and the backend web service. The transforms and the code underlying the web forms is automatically combined into a frontend to the web service. The web based frontend is published on a user site, such that users can access the backend web service through the frontend.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
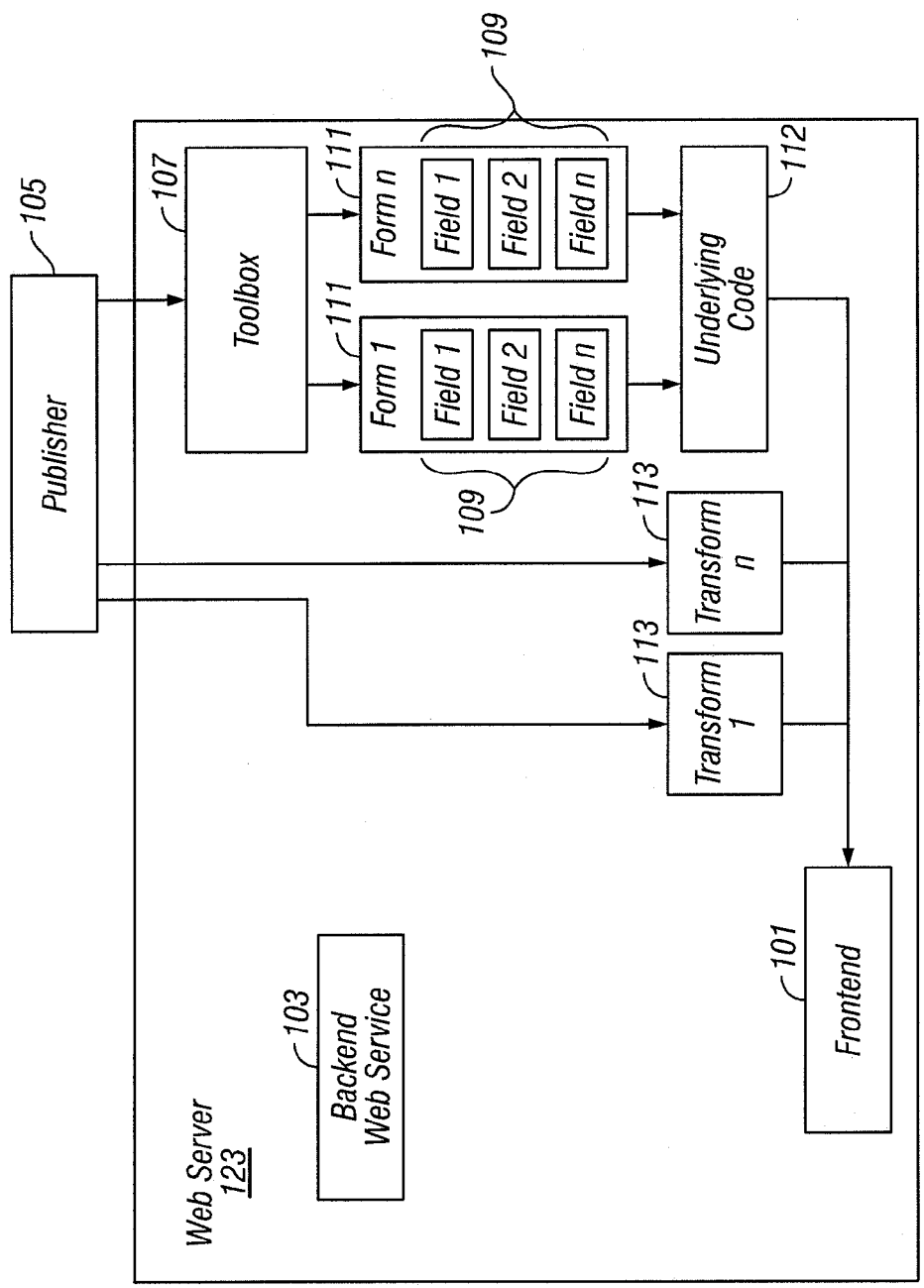
FIG. 1 is a block diagram illustrating a publisher using an embodiment of the present invention to create a web frontend.

FIG. 1 illustrates components used in the creation of frontends 101 to web services 103, according to some embodiments of the present invention. It is to be understood that although certain components are illustrated as separate entities, the illustrated components represent collections of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

Various embodiments of the present invention allow publishers 105 of web services 103 to quickly create web frontends 101 for their backend web based services 103. As illustrated in FIG. 1, a publisher 105 uses a toolbox 107 to define web based forms 111. The publisher graphically selects and configures fields 109 of the various forms 111 that make up a desired web based frontend 101. For example, the publisher 105 can select desired user interface fields 109 from the toolbox 107, such as buttons, text fields, text entry prompts, checkboxes, grids, file upload selectors, etc. The publisher 105 can also manipulate the sizes and positions of the fields 109, and otherwise affect their appearance and behavior by assigning/selecting features such as color, default value, maximum length, ID, etc. The publisher 105 can also use the toolbox 107 to specify web form/page 111 behavior. Underlying code 112 (e.g., XML) is generated to instantiate a web form 111 as defined by the publisher 105. The underlying code 112 interfaces with the publisher 105 defined transforms 113 described below.

Once a web form 111 is defined, the publisher 105 typically creates a transform 113 (e.g., an Extensible Stylesheet Markup Language Transform, or XSLT) to process the form data (e.g., the data entered by a user accessing the web form 111). This typically involves mapping the input data to parameters taken by a function call to the backend web service 103. Generally, the publisher provides an XSLT 113 that can also detect the input of bad data (e.g., a number out of range, or alphabetic input when a number is expected) and output an appropriate error message to the user of the web form 111. The publisher 105 also provides an XSL transform 113 to process the return value from the backend function, typically using it in the next web page/form 111 of the frontend 101. The publisher 105 repeats this process of defining web forms/pages 111 and associated transforms 113 until the desired functionality of the web based frontend 101 has been implemented. Once a publisher has configured a web based frontend 101 by defining web forms 111 and transforms 113, the transforms 113 and the generated code 112 underlying the web forms 111 are combined into a web based frontend 101.

In some embodiments of the present invention, in order to define a web based frontend 101, a publisher 105 logs onto an account on a web server 123 which provides the above-described frontend 101 creation functionality. It is to be understood that the web server 123 is to be one capable of executing custom programs, such as Apache or Microsoft's Internet Information Server. The web server 123 could also be implemented as a custom server 123. FIG. 1 illustrates the frontend 101 creation functionality residing on the same, single web server 123 as the backend web service 103. Of course, in other embodiments, the frontend 101 creation functionality and/or the backend web service 103 can be distributed between multiple web servers 123 as desired.

It is to be further understood that the backend web service 103 in question is to be one with a well defined Application Programming Interface (API), so that transforms 113 can be easily created that map input data to function calls to the backend 103. For example, web services that use WSDL, SOAP, or XML-RPC (e.g., Amazon and Google web services) have well defined APIs.

Figure 2:
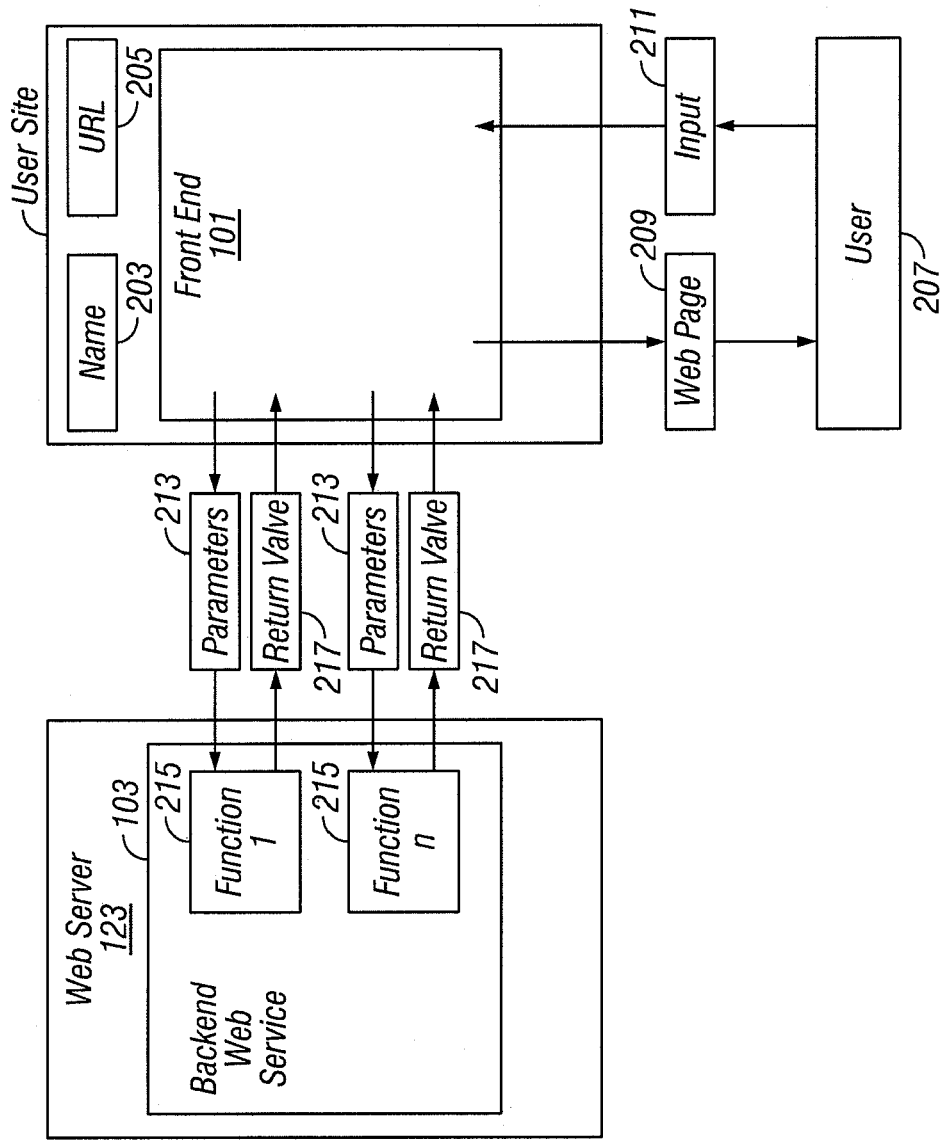
FIG. 2 is a block diagram illustrating the publication of a web frontend on a user site, according to some embodiments of the present invention.

As illustrated in FIG. 2, once a frontend 101 has been created, the frontend 101 can be published on a user accessible web site 201. The publisher 105 can choose or be assigned a name 203 of the site 201, and is also provided with a Uniform Resource Locator (URL) 205 pointing thereto. Third party users 207 can then access the web service 103 via the frontend 101 by visiting the site 201 on which it is published. When the user 207 visits the web site 201, the user 207 is presented with the publisher 105 defined default page 209 of the frontend 101. When a user 207 operates the frontend 101, the user enters the requested data 211 into the web forms 111 of the frontend 101, clicks specific links, or takes other actions the publisher 105 defined. The associated publisher 105 defined transforms 113 of the frontend 101 map the user input 211 to the input parameters 213 of the appropriate web service functions 215. The called functions 215 run with the corresponding input parameters 213, and other transforms 113 processes the return values 217. The user 207 continues to be presented with dynamically generated web pages 209, based on publisher 105 settings. In this way, the user 207 can access the various features of the backend web service 103 via the published frontend 101.

FIG. 2 illustrates the frontend 101 and the backend web service 103 residing on two separate servers 123, 201. Of course, in other embodiments, the frontend 101 and the backend web service 103 can reside on a single computer, or be distributed between multiple web servers 123, 201 in other ways, as desired.

To clarify the operation of an embodiment of the present invention, the creation of a frontend 101 to a web service 103 that prompts a user 207 for his or her name, and prints out "Hello [name]" is described. The publisher 105 uses the toolbox 107 to create a web interface with the form 111 illustrated in FIG. 3. The text field has an ID of "UserName."

The publisher 105 sets the page 209 as the main entry page 209 for their user site 201, and adds the XSL transform 113 of Table 1 to handle the entry of the name data 211. Note that the transform 113 checks for valid data 211, and passes the valid entered name 211 to the backend 103.

Table 1

TABLE 1

```
<?xml version="1.0" standalone="yes" ?.
<SymWSTransform versiom="1.0" name="Name form XSLT" debug="false">
    <Transform>
        <xsl:stylesheet
            version="1.0"
            xmlns:xsl="http://www.w3.org/1999/XSL/Transform"
            xmlns:symxslt="urn:symxslt">
            <!-- put the username in a var -->
            <xsl:param name="UsersName">
                <xsl:value-of select="/root/FormData/UserName" />
            </xsl:param>
            <!-- make sure we received a username -->
            <xsl:choose>
                <xsl:when test="$UsersName = "
                    <xsl:output method="html" omit-xml-declaration="yes" />
                    <b>You must enter a name.</b><br/>
                    <xsl:value-of select="/root/OriginalForm" disable-output-escaping="yes"/>
                </xsl:when>
                <xsl:otherwise>
                    <!-- build the input param for our web service call -->
                    <xsl:paran name="WebServiceParam">
                        <SOAP:Envelope xnlns:SOAP="http://schemas.xmlsoap.org/soap/envelope/">
                            <SOAP:Body>
                                <m:HelloWorld xmlns:m="http://www.publisher.con/">
                                    <usernane><xsl:value-of select="$UsersName" /></username>
                                </m:HelloWorld>
                            </SOAP:Body>
                        </SOAP:Envelope>
                    </xsl:param>
                    <!-- call our web service, using response.xsl to transform the response -->
                    <xsl:param name="WebServiceOutput">
                        <xsl:value-of
                            select="symxslt:CallWebService ($WebServiceParam, 'response.xsl')" />
                    </xsl:param>
                </xsl:otherwise>
            </xsl:choose>
        </Transform>
</SymWSTransform>
```

The publisher 105 adds another XSL transform 113, named 'response.xsl,' to process the return value 217 from web service 103. Response.xsl is illustrated in Table 2:

Table 2

TABLE 2

```
<?xml version="1.0" standalone="yes" ?>
<SymWSTransform version="1.0" name="Name form XSLT" debug="false">
    <Transform>
        <xsl:stylesheet version="1.0"
            xmlns:xsl="http://www.w3.org/1999/XSL/Transform"
            xmlns symxslt="urn:symxslt">
        <xsl output method="html" omit-xml-declaration="yes" />
        <!-- display the results -->
        <b>The web service says:</b>
        <xsl:value-of select="/root/WebServiceOutput/HelloWorldResponse/Result" />
    </Transform>
</SymWSTransform>
```

Figure 3:
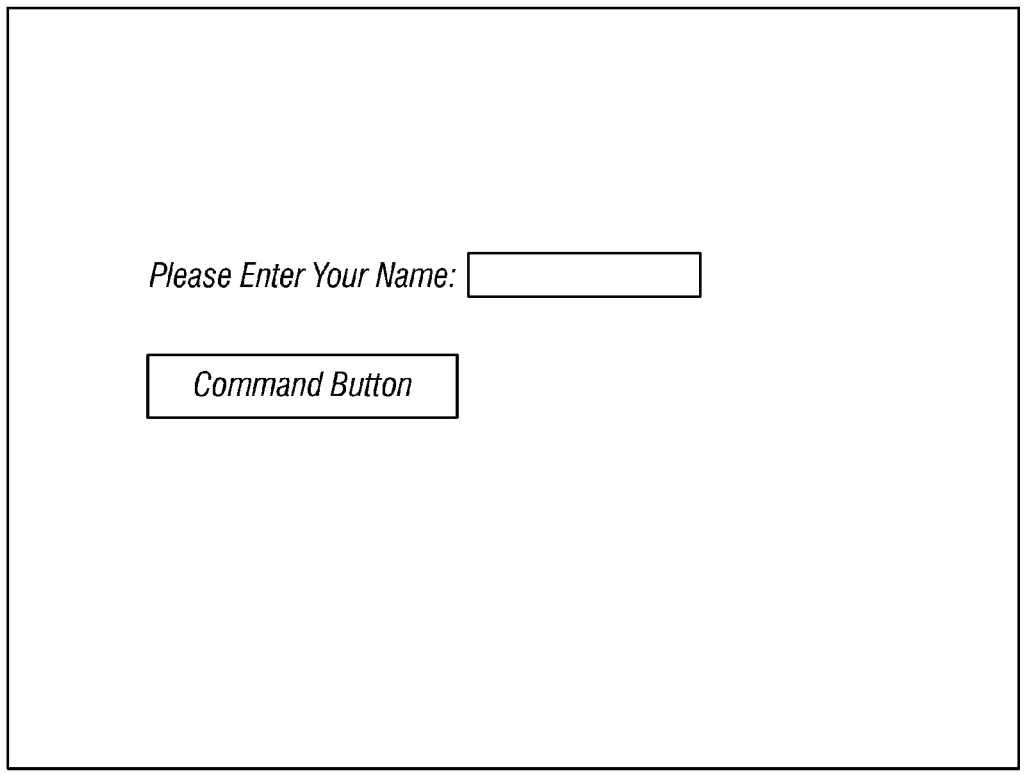
FIG. 3 is a screen diagram illustrating a web interface with a form created according to some embodiments of the present invention.

The frontend 101 is published on a user site 201 at an assigned URL 205, and given the name 203 'HelloWorld.' A user 207 visits the site 201 and is presented with the form 111 illustrated in FIG. 3. The user 207 types in "Joe" and clicks submit. The web service frontend 101 parses the form data 211 and makes it available to the appropriate XSL transform 113 which, in this case, validates the input 211 and generates a call 215 to the backend web service 103 which is illustrated in Table 3:

Table 3

TABLE 3

```
<?xml version="1.0" standalone="yes" ?>
<SOAP:Envelope xmlns:SOAP="http://schemes.xmlsoap.org/soap/envelope/">
    <SOAP:Body>
        <m:HelloWorld xmlns:m="http://www.publisher.com/">
            <username>Joe</username>
        </m:HelloWorld>
    </SOAP:Body>
</SOAP:Envelope>
The server responds with:
<?xml version="1.0"?22
<SOAP-ENV:Envelope SOAP-
ENV:encodingStyle="http://schemas.xmlsoap.org/soap/encoding/"
        xmlns:SOAP-ENC="http://schemas.xmlsoap.org/soap/encoding/"
        xmlns:SOAP-ENV="http://schemas.xmlsoap.org/soap/envelope/"
        xnlns:xsd="http://www.w3.org/1999/XMLSchema"
        xnlns:xsi="http://www.w3.org/1999/XMLSchema-instence">
<SOAP-ENV: Body>
    <HelloWorldResponse>
        <Result xsi:type="xsd:string">Hello Joe!</Result>
    </HelloWorldResponse>
    </SOAP-ENV:Body>
</SOAP-ENV:Envelope>
```

The backend web service 103 returns a response 217, which the frontend 101 parses. The frontend 101 makes all XML nodes available, in this example under /root/WebServiceOutput. The frontend 101 then executes the XSL transform 113 specified in the symxslt:CallWebService( ), which in this case is response.xsl. The transform 113 response.xsl outputs the following:

<b>The web service says:</b>

Hello Joe!

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for creating a web based frontend for backend web services, the backend web services being separate applications from the web based frontend, the method comprising the steps of:
   responsive to a publisher graphically defining at least one web based form, automatically providing associated underlying code, by a computer;
   receiving, by the computer, a plurality of transforms from the publisher, the received plurality of transforms comprising at least:
      a transform for mapping at least one input parameter from the at least one defined web form to a call to a separate backend web service;
      a transform for processing at least one return value from the separate backend web service; and
      a transform for outputting at least one message to a user of the frontend;
   combining, by the computer, the received plurality of transforms and the underlying code for the at least one defined web form into a frontend to the separate backend web service; and
   publishing, by the computer, the frontend such that the separate backend web service can be accessed by third party users through the frontend.

2. The method of claim 1 further comprising:
   providing, by the computer, a toolbox for publishers to graphically define web forms by selecting and configuring frontend components.

3. The method of claim 1 wherein automatically providing associated underlying code, by the computer further comprises:
   responsive to a publisher graphically defining at least one web based form, generating, by the computer, corresponding markup language.

4. The method of claim 3 wherein generating, by the computer, corresponding markup language further comprises:
   generating, by the computer, corresponding Extensible Markup Language.

5. The method of claim 1 wherein receiving, by the computer, the plurality of transforms from the publisher further comprises:
   receiving, by the computer, a plurality of transforms for mapping frontend input to corresponding calls to the separate backend web service, processing values returned from the separate backend web service at the frontend and providing error messages to the user of the frontend.

6. The method of claim 1 wherein receiving, by the computer, the plurality of transforms from the publisher further comprises:
   receiving, by the computer, at least one Extensible Stylesheet Language Transform.

7. The method of claim 1 wherein publishing, by the computer, the frontend such that the separate backend web service can be accessed by third party users through the frontend further comprises:
   assigning, by the computer, a name and a Uniform Resource Locator to a user accessible web site; and
   placing, by the computer, the frontend on the user accessible web site.

8. At least one computer readable storage medium storing a computer program product for creating a web based frontend for backend web services, the backend web services being separate applications from the web based frontend, the computer program product comprising:
   program code for, responsive to a publisher graphically defining at least one web based form, automatically providing associated underlying code;
   program code for receiving a plurality of transforms from the publisher, the received plurality of transforms comprising at least:
      a transform for mapping at least one input parameter from the at least one defined web form to a call to a separate backend web service;
      a transform for processing at least one return value from the separate backend web service; and
      a transform for outputting at least one message to a user of the frontend;
   program code for combining the at received plurality of transforms and the underlying code for the at least one defined web form into a frontend to the separate backend web service; and
   program code for publishing the frontend such that the separate backend web service can be accessed by third party users through the frontend.

9. The computer program product of claim 7 further comprising:
   program code for providing a toolbox for publishers to graphically define web forms by selecting and configuring frontend components.

10. The computer program product of claim 7 wherein the program code for automatically providing associated underlying code further comprises:
    program code for, responsive to a publisher graphically defining at least one web based form, generating corresponding markup language.

11. The computer program product of claim 10 wherein the program code for generating corresponding markup language further comprises:
    program code for generating corresponding Extensible Markup Language.

12. The computer program product of claim 7 wherein the program code for receiving the plurality of transforms from the publisher further comprises:
    program code for receiving a plurality of transforms for mapping frontend input to corresponding calls to the separate backend web service, processing values returned from the separate backend web service at the frontend and providing error messages to the user of the frontend.

13. The computer program product of claim 7 wherein the program code for receiving the plurality of transforms from the publisher further comprises:
    program code for receiving at least one Extensible Stylesheet Language Transform.

14. The computer program product of claim 7 wherein the program code for publishing the frontend such that the separate backend web service can be accessed by third party users through the frontend further comprises:
    program code for assigning a name and a Uniform Resource Locator to a user accessible web site; and
    program code for placing the frontend on the user accessible web site.

15. A computer system for creating a web based frontend for backend web services, the backend web services being separate applications from the web based frontend, the computer system comprising:

means for, responsive to a publisher graphically defining at least one web based form, automatically providing associated underlying code;

means for receiving a plurality of transforms from the publisher, the received plurality of transforms comprising at least:
- a transform for mapping at least one input parameter from the at least one defined web form to a call to a separate backend web service;
- a transform for processing at least one return value from the separate backend web service; and
- a transform for outputting at least one message to a user of the frontend;

means for combining the received plurality of transforms and the underlying code for the at least one defined web form into a frontend to the separate backend web service; and means for publishing the frontend such that the separate backend web service can be accessed by third party users through the frontend.

16. The computer system of claim 15 further comprising:

means for providing a toolbox for publishers to graphically define web forms by selecting and configuring frontend components.

17. The computer system of claim 15 wherein the means for automatically providing associated underlying code further comprise:

means for, responsive to a publisher graphically defining at least one web based form, generating corresponding markup language.

18. The computer program product of claim 17 wherein the means for generating corresponding markup language further comprise:

means for generating corresponding Extensible Markup Language.

19. The computer system of claim 15 wherein the means for receiving the plurality of transforms from the publisher further comprise:

means for receiving at least one Extensible Stylesheet Language Transform.

20. The computer system of claim 15 wherein the means for publishing the frontend such that the separate backend web service can be accessed by third party users through the frontend further comprise:

means for assigning a name and a Uniform Resource Locator to a user accessible web site; and means for placing the frontend on the user accessible web site.

* * * * *

UNITED STATES PATENT AND TRADEMARK OFFICE
CERTIFICATE OF CORRECTION

| | | |
|---|---|---|
| PATENT NO. | : 7,831,919 B1 | Page 1 of 1 |
| APPLICATION NO. | : 11/612404 | |
| DATED | : November 9, 2010 | |
| INVENTOR(S) | : Pieter Viljoen and Shaun Cooley | |

It is certified that error appears in the above-identified patent and that said Letters Patent is hereby corrected as shown below:

In Claim 8, col. 8, line 19, replace "at received" with --received--.

Signed and Sealed this

Twenty-first Day of December, 2010

David J. Kappos
*Director of the United States Patent and Trademark Office*